United States Patent
Kornhaas et al.

(10) Patent No.: US 8,768,592 B2
(45) Date of Patent: Jul. 1, 2014

(54) REDUCING THE STEERING TORQUE DURING BRAKING MANEUVERS

(75) Inventors: Robert Kornhaas, Spraitbach (DE); Achim Schoen, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/517,902

(22) PCT Filed: Oct. 21, 2010

(86) PCT No.: PCT/EP2010/065881
§ 371 (c)(1),
(2), (4) Date: Aug. 29, 2012

(87) PCT Pub. No.: WO2011/076457
PCT Pub. Date: Jun. 30, 2011

(65) Prior Publication Data
US 2012/0330525 A1    Dec. 27, 2012

(30) Foreign Application Priority Data

Dec. 21, 2009  (DE) .......................... 10 2009 055 059

(51) Int. Cl.
*B60T 8/26* (2006.01)
(52) U.S. Cl.
USPC .......................................................... 701/70

(58) Field of Classification Search
USPC ............................................................ 701/70
See application file for complete search history.

(56) References Cited

U.S. PATENT DOCUMENTS 5,282,674 A * 2/1994 Matsuda ...................... 303/9.71
6,183,048 B1 * 2/2001 Takahira et al. ........... 303/113.1

FOREIGN PATENT DOCUMENTS

| CN | 1117453 | 2/1996 |
| CN | 101484341 | 7/2009 |
| DE | 41 41 875 | 6/1992 |
| JP | 4-221263 | 8/1992 |
| JP | 2001-80484 | 3/2001 |
| JP | 2010-58618 | 3/2010 |
| WO | WO 2008/010588 | 1/2008 |
| WO | 2009/010588 | 1/2009 |
| WO | WO-2009/010588 A1 * | 1/2009 ............. B60K 31/00 |

* cited by examiner

*Primary Examiner* — Mary Cheung
*Assistant Examiner* — Brian P Sweeney
(74) *Attorney, Agent, or Firm* — Kenyon & Kenyon LLP

(57) ABSTRACT

A method for reducing the steering torque in a motor vehicle in a driving situation in which the vehicle is being braked and steered at the same time. By shifting the brake force to the rear wheels, the front wheels become easier to steer compared to a standard brake force distribution. The maximum required power of an electric steering assistance system is thus greatly reduced.

20 Claims, 2 Drawing Sheets

REDUCING THE STEERING TORQUE DURING BRAKING MANEUVERS

FIELD OF THE INVENTION

The present invention relates to a method for reducing the steering torque in a motor vehicle in a driving situation in which the vehicle is being braked and steered at the same time.

BACKGROUND INFORMATION

During a braking operation, the steering torque of the front wheels is increased by the braking of the wheels themselves on the one hand and also by shifting the vehicle weight to the front wheels on the other hand. Both result in more energy having to be expended for a steering motion than is the case with unbraked wheels. Large steering torques occur, for example, in a turning maneuver known as a "three-point turn" or in braking maneuvers at a low speed. Traditional electric power steering systems (EPS) must be designed for such extreme situations and are therefore relatively powerful and expensive.

SUMMARY OF THE INVENTION

An object of the exemplary embodiments and/or exemplary methods of the present invention is therefore to reduce the steering torque acting on the front wheels during driving situations in which the vehicle is being braked and steered at the same time.

This object may be achieved according to the exemplary embodiments and/or exemplary methods of the present invention by the features described herein. Additional embodiments of the present invention are the subject matter of the further descriptions herein.

According to the exemplary embodiments and/or exemplary methods of the present invention, the brake force on the rear wheels may be increased automatically in a driving situation in which the vehicle is being braked and steered at the same time as compared to a standard mode (i.e., a braking maneuver without an additional steering motion). This achieves the result that the rear wheel brakes assume a relatively larger proportion of the desired total brake force. This relieves the load on the front wheels, and the steering torque on the front wheels becomes proportionately smaller. Consequently, the servo motor of a power steering system may be designed for a lower maximal power and with smaller dimensions.

According to a specific embodiment, the brake force on the front wheels is at least partially reduced or is set to be lower during a braking operation in which the vehicle is being steered than in a standard mode. The brake force on the rear wheels is increased comparatively. The total brake force is therefore shifted at least partially from the front wheels to the rear wheels, and the load on the front wheels is reduced, which in turn results in a reduction in the steering torque on the front wheels.

The brake force on the rear wheels may be set to be greater than that on the front wheels.

In certain driving situations, for example, when reversing, the vehicle may also be braked only via the rear wheel brakes. In this case the brake force on the rear wheel brakes is increased while the front wheels remain entirely or essentially unbraked. Such driving maneuvers are detectable by monitoring the wheel rotational speed sensors, for example.

The shifting of the brake force to the rear wheel brakes, as described above, may be implemented only if the vehicle is being actively steered, i.e., there is a change in the steering angle. However, the vehicle should be braked in a standard mode during a braking maneuver in which the steering angle remains constant, as in driving straight ahead, for example, or when negotiating curves at a constant radius. Any change in the steering angle is detectable via a steering angle sensor, for example.

The shifting of brake forces according to the present invention should be implemented only at low vehicle speeds for safety reasons. According to the exemplary embodiments and/or exemplary methods of the present invention, a speed threshold value, for example, 20 km/h or less, may be predefined, so that a speed below this level would trigger the automatic function. At higher vehicle speeds, the vehicle should be braked in a standard mode.

According to one particular specific embodiment of the present invention, it may be provided that the brake force is automatically shifted to the rear wheel brakes only when the change in the steering angle is greater or faster than a predefined threshold value. At smaller steering angles or slower steering angle changes, the vehicle should be braked in a standard braking mode.

The distribution of the brake forces according to the present invention may be neutral with regard to braking torque, i.e., the sum of the brake forces should correspond to the total brake force in the standard mode and thus should not influence the deceleration of the vehicle expected by the driver.

The exemplary embodiments and/or exemplary methods of the present invention will be explained in greater detail below on the basis of the accompanying drawings by way of example.

DETAILED DESCRIPTION

Figure 1:
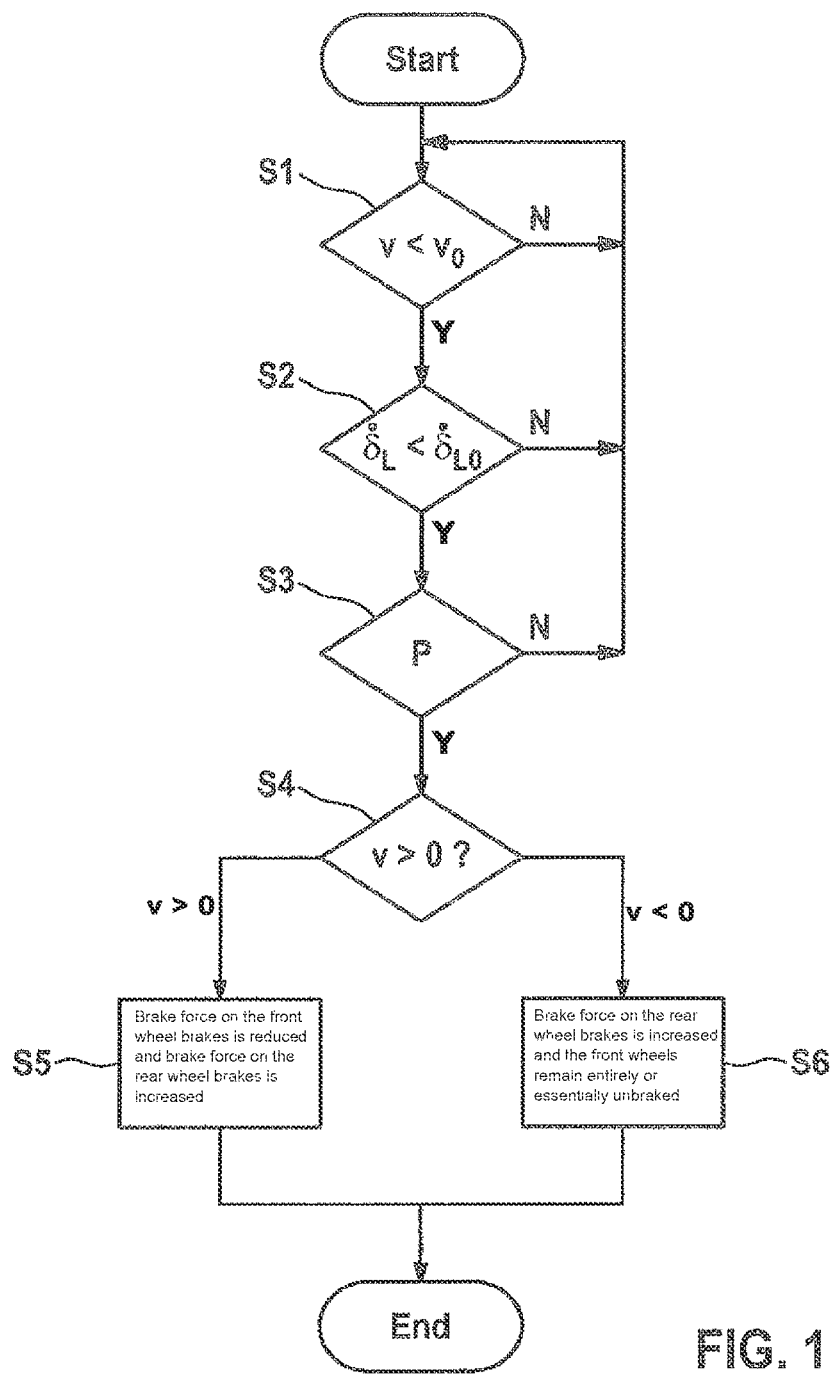
FIG. 1 shows a flow chart of a method for reducing the steering torque on the front wheels of a vehicle.

FIG. 1 shows a simplified flow chart of a method for reducing the steering torque on the front wheels of a vehicle. During driving situations in which the vehicle is being braked and steered at the same time, the front wheels are braked less compared to a standard braking maneuver (i.e., a braking maneuver without a steering motion) and thus the load on them is reduced. The steering torque on the front wheels may thus be reduced.

After initializing the method, a check is initially performed in step S1 to ascertain whether vehicle speed v is less than a predefined threshold value $v_0$, e.g., 20 km/h or less. Furthermore, it may be established whether the vehicle is moving forward or in reverse. If speed v is less than threshold value $v_0$, a check is performed in step S2, to ascertain whether the change in the steering angle over time is greater than a predefined threshold value. Otherwise the method branches back to the start. If the change in the steering angle over time in step S2 is greater than the threshold value, a check is also performed in step S3, to ascertain whether the brake pedal is being operated. This may be accomplished using a traditional brake pedal sensor. If the brake pedal is being operated, the brake forces of the front and rear wheel brakes are automatically adjusted with respect to a standard braking maneuver. Otherwise the method branches back to the start. Finally in step S4, a distinction is made between driving forward and in reverse on the basis of the wheel rotational speed sensors.

Case S5 relates to a driving situation in which the vehicle is moving in the forward direction (v>0) and is being braked and the driver begins to steer at a certain point in time, for example, to turn. In this case, the brake force on the front wheel brakes is reduced and the brake force on the rear wheel brakes is increased. The change in the brake forces takes place in a neutral manner with regard to braking torque, so that the deceleration of the vehicle is not affected.

Case S6 relates to a driving situation in which the vehicle is being driven in reverse (v<0), e.g., in the second phase of a three-point turning maneuver. In this case, the brake force on the rear wheel brakes is increased, while the front wheels remain entirely or essentially unbraked.

In both cases, the steering torque on the front wheels may be reduced compared to braking in the standard mode.

Figure 2:
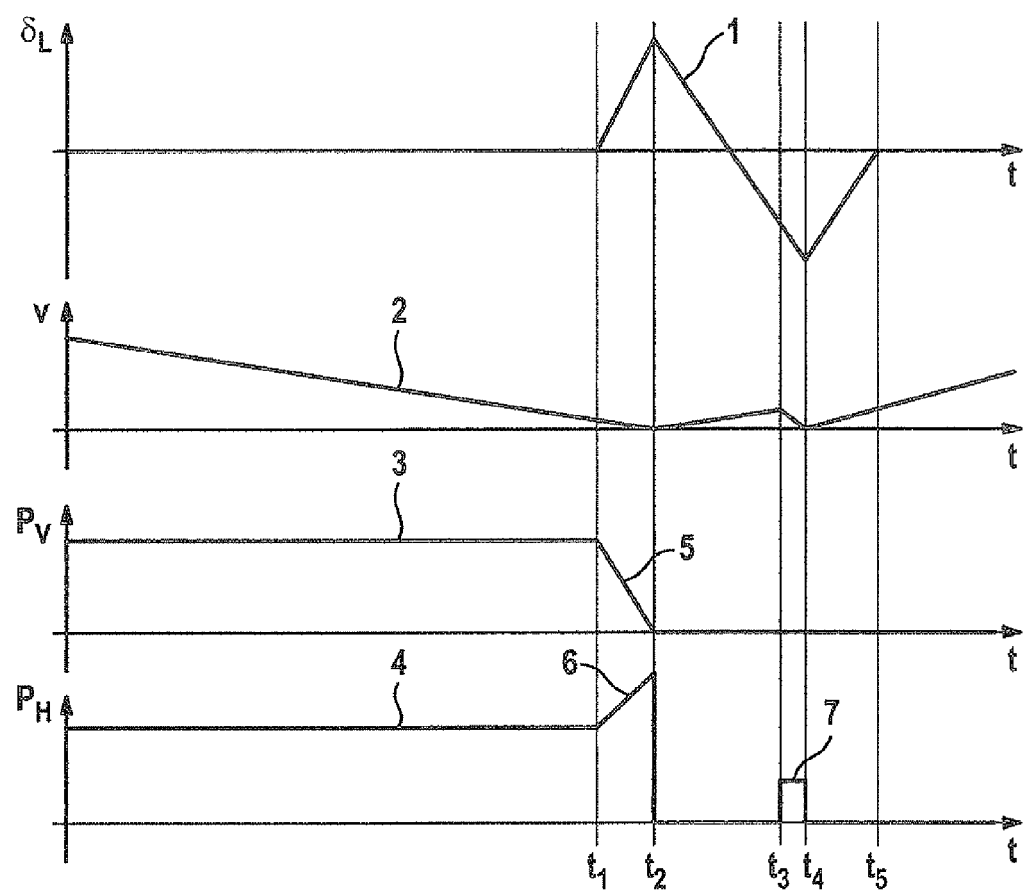
FIG. 2 shows the curve of the steering angle, speed and brake pressure on the front wheels and the rear wheels in a "three-point turn" maneuver.

FIG. 2 shows the curve of steering angle $\delta_L$, vehicle speed v, brake pressure $p_V$ on the front wheels, and brake pressure $p_H$ on the rear wheels as a function of time during a three-point turning maneuver. The vehicle is initially decelerated from being driven straight ahead by operating all wheel brakes. At point in time $t_1$ the turning maneuver begins when the driver steers the vehicle in one direction. Steering angle $\delta_L$ increases linearly, as shown by curve 1. As soon as a change in the steering angle has been detected, brake pressure $p_V$ on the front wheels is completely reduced (see section 5 of characteristic line 3) and the brake pressure on the rear wheels is increased accordingly (see section 6 of characteristic line 4). The total braking torque remains constant.

At point in time $t_2$ the vehicle comes to a standstill at maximal steering angle $\delta_L$. Now the brake pressure on the rear wheels is also reduced completely, as shown by characteristic line 4. The vehicle is subsequently accelerated in reverse while the steering angle declines at the same time and ultimately becomes negative (see characteristic line 1). At point in time $t_3$ the driver begins to brake again. Since he is reversing, the brake pressure is built up only on the rear wheels. The front wheels remain unbraked. At point in time $t_4$ the vehicle comes to a standstill at the maximal counter-deflection of the steering wheel. The brake pressure on the rear wheels is then reduced completely. The vehicle is subsequently accelerated in the forward direction again and the steering wheel is brought into the neutral position (see characteristic line 1). The turning maneuver is thus concluded.

What is claimed is:

1. A method for reducing a steering torque in a motor vehicle in a driving situation in which the vehicle is being braked and steered at the same time, the method comprising:
    determining, using a steering sensor, if the vehicle is being actively steered;
    determining, using a braking sensor, if the vehicle is being actively braked;
    performing a check, by a processing device, of whether the vehicle is being braked and steered at the same time; and
    automatically increasing, by the processing device, the brake force on the rear wheels when the vehicle is being braked and steered at the same time, wherein the brake force on the rear wheels is set to be higher than the brake force on the front wheels.

2. The method of claim 1, wherein the brake force on the front wheels is at least partially reduced or is set to be lower than in a standard mode.

3. The method of claim 1, wherein the direction of travel of the vehicle is monitored and only the rear wheels are braked when the vehicle is being driven in reverse.

4. The method of claim 1, wherein a steering angle is monitored and the brake force on the rear wheels is automatically increased as soon as a change in the steering angle has been detected.

5. The method of claim 1, wherein the vehicle speed is monitored and the brake force on the rear wheels is automatically increased when the vehicle speed is less than a predefined threshold value.

6. The method of claim 1, wherein a brake force is automatically increased when the steering angle or the change in the steering angle exceeds a threshold value.

7. The method of claim 1, wherein the sum of the brake force on all wheels corresponds to a desired braking demand.

8. The method of claim 1, wherein the brake force on the front wheels is at least partially reduced or is set to be lower than in a standard mode, wherein the direction of travel of the vehicle is monitored and only the rear wheels are braked when the vehicle is being driven in reverse.

9. The method of claim 8, wherein a steering angle is monitored and the brake force on the rear wheels is automatically increased as soon as a change in the steering angle has been detected, wherein the vehicle speed is monitored and the brake force on the rear wheels is automatically increased when the vehicle speed is less than a predefined threshold value.

10. The method of claim 8, wherein a brake force is automatically increased when the steering angle or the change in the steering angle exceeds a threshold value, wherein the sum of the brake force on all wheels corresponds to a desired braking demand.

11. A control unit, for reducing a steering torque in a motor vehicle in a driving situation in which the vehicle is being braked and steered at the same time, comprising:
    a steering sensor to determine if the vehicle is being actively steered;
    a braking sensor to determine if the vehicle is being actively braked;
    a checking arrangement to check whether the vehicle is being braked and steered at the same time, and
    a brake controller to automatically increase the brake force on the rear wheels when the vehicle is being braked and steered at the same time, wherein the brake force on the rear wheels is set to be higher than the brake force on the front wheels.

12. The control unit of claim 11, wherein the brake force on the front wheels is at least partially reduced or is set to be lower than in a standard mode.

13. The control unit of claim 11, wherein the direction of travel of the vehicle is monitored and only the rear wheels are braked when the vehicle is being driven in reverse.

14. The control unit of claim 11, wherein a steering angle is monitored and the brake force on the rear wheels is automatically increased as soon as a change in the steering angle has been detected.

15. The control unit of claim 11, wherein the vehicle speed is monitored and the brake force on the rear wheels is automatically increased when the vehicle speed is less than a predefined threshold value.

16. The control unit of claim 11, wherein a brake force is automatically increased when the steering angle or the change in the steering angle exceeds a threshold value.

17. The control unit of claim 11, wherein the sum of the brake force on all wheels corresponds to a desired braking demand.

18. The control unit of claim 11, wherein the brake force on the front wheels is at least partially reduced or is set to be lower than in a standard mode, wherein the direction of travel of the vehicle is monitored and only the rear wheels are braked when the vehicle is being driven in reverse.

19. The control unit of claim 18, wherein a steering angle is monitored and the brake force on the rear wheels is automatically increased as soon as a change in the steering angle has been detected, wherein the vehicle speed is monitored and the brake force on the rear wheels is automatically increased when the vehicle speed is less than a predefined threshold value.

20. The control unit of claim 18, wherein a brake force is automatically increased when the steering angle or the change in the steering angle exceeds a threshold value, wherein the sum of the brake force on all wheels corresponds to a desired braking demand.

\* \* \* \* \*